Aug. 19, 1969     J. V. CROYLE     3,461,488

MOLD EJECTION ASSEMBLABLE TWO-PIECE CAP

Filed April 8, 1966     3 Sheets-Sheet 1

INVENTOR.
JACK V. CROYLE
BY *Robert J Doherty*
ATTORNEY

INVENTOR.
JACK V. CROYLE
BY
ATTORNEY

INVENTOR.
JACK V. CROYLE

ATTORNEY

United States Patent Office 3,461,488
Patented Aug. 19, 1969

3,461,488
MOLD EJECTION ASSEMBLABLE
TWO-PIECE CAP
Jack V. Croyle, Woonsocket, R.I., assignor to Rexall Drug and Chemical Company, Los Angeles, Calif., a corporation of Delaware
Filed Apr. 8, 1966, Ser. No. 541,202
Int. Cl. B29f 1/00
U.S. Cl. 18—2                                           2 Claims

ABSTRACT OF THE DISCLOSURE

An injection mold for seriatim molding and assembling a dispensing closure. The mold has primary and secondary cavities and set of cores which is engaged with the component formed in the secondary cavity, and moves it into engagement with the component formed in the primary cavity.

---

This invention relates to an injection mold which is adapted to mold and assemble two pieces of a dispensing closure.

It is desirable that dispensing closures for fluid substances, such as free-flowing solids and liquids including detergents and the like, be easily manipulated from an open dispensing position to a closed non-dispensing or sealing position and that such actuating movement be obvious and simple to the ultimate user. As such dispensing closures are primarily used in conjunction with throwaway containers, a further important factor is that such must be relatively inexpensive in order to gain widespread use. One of the major contributing factors to increased cost of such closures is the mechanical assembling procedures that must be carried out thereupon to place such in operating condition.

Hitherto mechanical assembly of component dispensing closure portions, notwithstanding the highly sophisticated machinery used in this regard and the highly developed state of the art in general, has been time-consuming and costly through the necessity of at least one additional secondary operation. The present invention, however, contemplates the assemblage of the component parts of the present novel closure construction within the mold itself upon the opening and ejection cycles thereof in such a manner that no increase in the molding cycle of the closure is necessitated and the use of a secondary operation to assemble the closure is obviated.

With the above comments and other objects in view that will hereinafter appear, the nature of the invention will be more clearly understood by reference to the following detailed description, the appended claims and the several views illustrated in the accompanying drawings, wherein like numerals refer to like parts.

Figure 9:
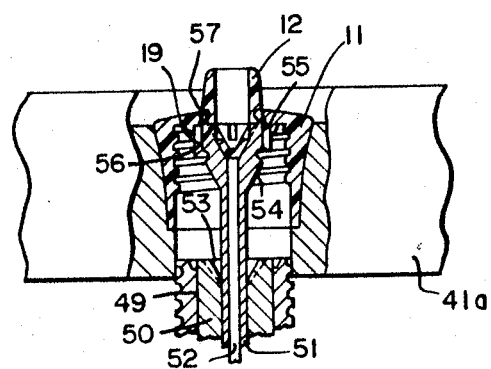
Figure 10:
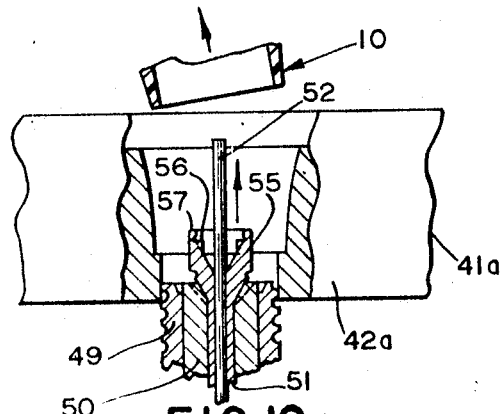
Figure 11:
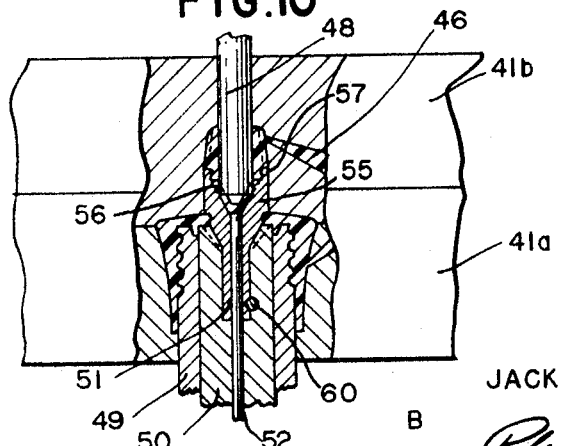

FIGURES 6 through 10 are sectional views of novel mold means by which the closure of the present invention may be molded and subsequently assembled and show particularly the sequential operations from the injection cycle thereof to the final ejection cycle thereof; and FIGURE 11 is a sectional view of alternate mold means for accomplishing the molding and assembly steps shown in FIGURES 6 through 10 in which fewer moving parts are utilized.

Reference is now made to the drawings in detail and particularly FIGURES 1 through 5 thereof wherein a two-piece fluid dispensing container closure of novel construction is illustrated and referred to by the reference numeral 10. Such closure 10 comprises a fixed part 11 and a movable part 12 which is assembled therewith for relative movement thereto in a non-longitudinal direction so as to be alternatively positionable from a closed non-dispensing position to an open dispensing position. While the movable part 12 in the drawings is shown in assembled position with the fixed part 11 so as to permit rotational movement thereto, it should be brought out that other movement such as non-longitudinal slide motion or the like is equally acceptable and that the rotational aspect depicted in the drawing is for illustrative purposes only.

The fixed part 11 may be integral with a fluid container or separable as illustrated and may have a top wall portion 13 with downwardly depending side walls 14 integral therewith. The side walls may be internally provided with screw threads 15 or other equivalent means for attachment to the neck of a conventional container and further be provided with sealing fins 16 or their like. The top wall is further provided with an opening 17 therethrough which has been illustratively shown as circular in the drawings to permit the rotational movement of the movable part 12 as contemplated; but as hereinbefore stated, the opening could be of other regular geometric configuration such as a rectangular slot wherein the relative rotational movement of the movable part to the fixed part would be a lateral slide rather than rotation.

The top wall 13 is further provided about the periphery of the opening 17 therethrough with a slotted skirt member 18 extending downwardly and preferably inwardly from the inner side of such top wall 13 so as to be positioned inwardly of the peripheral extent of the opening at its lower terminus. Such slotted skirt member 18 is generally comprised of two or more downwardly inwardly extending flanges 19 separated from each other by slotted portions 20. The top wall 13 of the fixed part 11 is further provided with holding means 21 located around the periphery of the opening 17 in such a manner as to captively hold the movable part in fixed longitudinal relationship thereto after the two components are assembled in a manner as will hereinafter be more clearly brought out. Such holding means 21 is shown by a circumferential bead 22 which inwardly extends into the opening 17 from the peripheral portions thereof and which is preferably provided with a gently sloped upper portion 23 to provide a lead-in for the assembling of the movable portions therewith in a cutaway area 24 positioned downwardly adjacent thereto.

The movable part 12 is comprised of a fluid dispensing portion 25, a valve member 26 and attachment means 27. The attachment means 27 permits the movable part to be assembled to the fixed part in such a manner to permit relative movement therewith to opening and closing positions and, furthermore, to prevent relative longitudinal motion thereto and may comprise in part, as shown, a groove 28 at the outer periphery of the movable part at the junction of its fluid dispensing portion 25 and its valve member 26. A fluid dispensing portion 25 may take a generally cylindrical configuration and is preferably provided at the other portion of its walls 29 with grooves or flutes 30 as a means by which the movable part may be grasped by the user of the device. The valve member 26 of the movable part generally extends entirely beneath the top wall 13 of the fixed part and is provided with side walls 31 adapted for intimate engagement with the flanges 19 of the skirt 18. The side walls 31 terminate in a base portion 32 which is imperforate and imparts to the valve member 26 a general over-all appearance of a truncated cone. The side walls 31 are further provided with at least one opening therethrough which is preferably orientated longitudinally thereof. In this manner then the intimate engagement of the valve member 26 with the skirt 18 when the openings 33 of the side walls are covered by the flanges 19 of the skirt 18 provides a non-dispensing closed position of the closure member 10 so as to confine fluid within the container. It may be seen that upon rotation of the movable part 12 in such a manner so as to at least partially align the openings 33 with the slots 20 of the skirt 18, an alternate open fluid dispensing position may be obtained. In this manner, by the relative movement of the movable part 12 in regard to the fixed part 11, alternate open and closed positions may be obtained for desired access to closure of the container.

Figure 1:
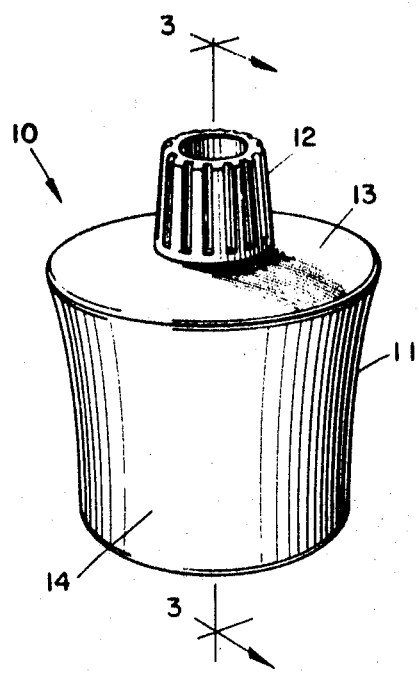
FIGURE 1 is a perspective view of the two-piece fluid dispensing container closure of the present invention shown in its assembled position.
Figure 2:
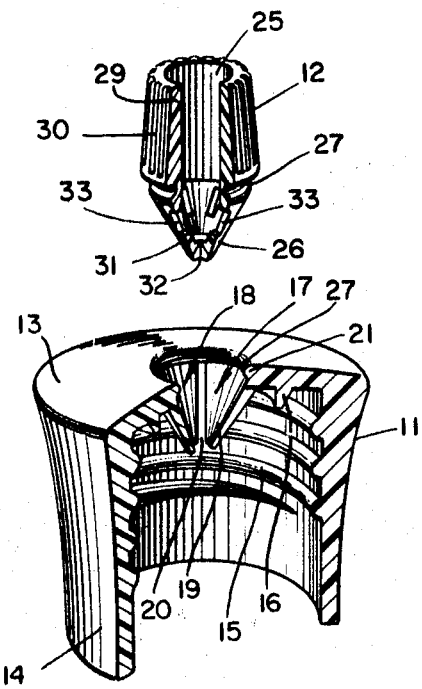
FIGURE 2 is an exploded perspective view of the closure shown in FIGURE 1 with portions broken away for clarity.
Figure 3:
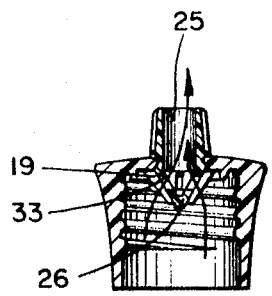
FIGURE 3 is a sectional view of the closure taken along the line 3—3 of FIGURE 1 and shows the path of flow of fluid from the container area when such closure is in its open dispensing position.
Figure 4:
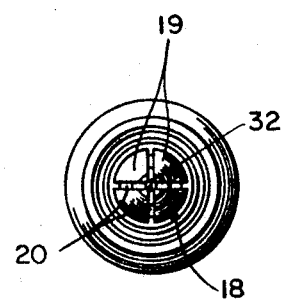
FIGURE 4 is a bottom view of the closure shown in FIGURES 1 and 3.
Figure 5:
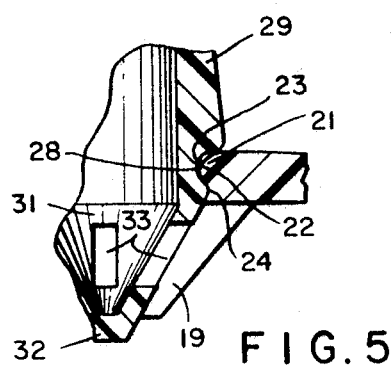
FIGURE 5 is an enlarged sectional view of a portion of the assembled closure showing the attachment portions thereof in greater detail.
Figure 6:
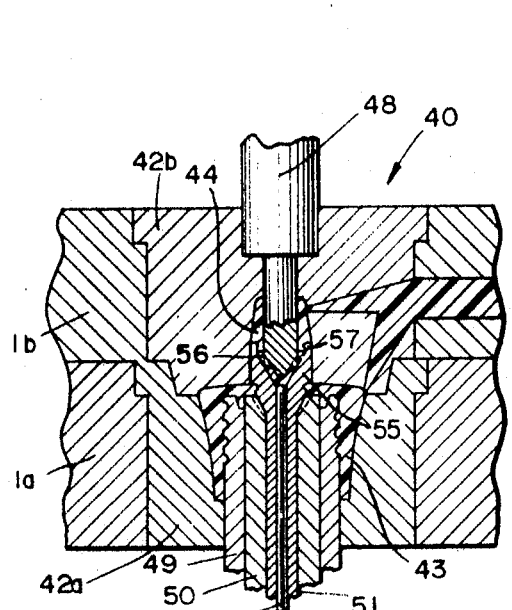

Turning now to the remainder of the drawings, specific preferred and alternate means are shown by which the structure of the closure may be serially molded and assembled in the same apparatus, which apparatus or molding means is adapted to specifically mold and assemble the closure shown in FIGURES 1 through 5. Referring to the drawings and more particularly to FIGURE 6 thereof, a mold 40 of multiple separable plate design is depicted. Such mold 40 has a plurality of relatively longitudinally movable and separable plates such as those 41a and 41b shown into which cavity inserts 42a and 42b are respectively positioned. The mold 40 in part comprises a primary and secondary cavities 43 and 44, respectively, which correspond to the fixed and movable parts of the closure 10. As is shown, the secondary cavity 44 is substantially completely separated from the primary cavity 43 and is longitudinally removed therefrom. The cavities are separately filled with molten material through injection access passages 45 and 46 which are in communication with an injection passage 47 connected to an injection molding machine not shown.

The configuration of the secondary cavity is further completed by a core pin 48 which is longitudinally slidable in relation to the secondary plate 41b in which the cavity insert 41b is held. The primary cavity on the other hand, is completed by a series of components on the core side thereof. Referring to such components in succession, there is a rotatable core sleeve 49, an intermediate slidable core sleeve 50, an inner slidable core sleeve 51, and a core pin 52 inwardly thereof. The intermediate core sleeve 50 is provided at its upper terminus with boss members 53 for engagement with the shoulder portion 54 of the inner slidable core sleeve 51 so as to effect formation of the slots 20 within the skirt 18 of the fixed member 11. Openings 33 within the side walls 31 of valve member 26 are formed by contact between the upper terminus of headed portion 55 of slidable sleeve 51 and bosses 56 and claw-like extensions 57 on secondary core pin 48.

Figure 7:
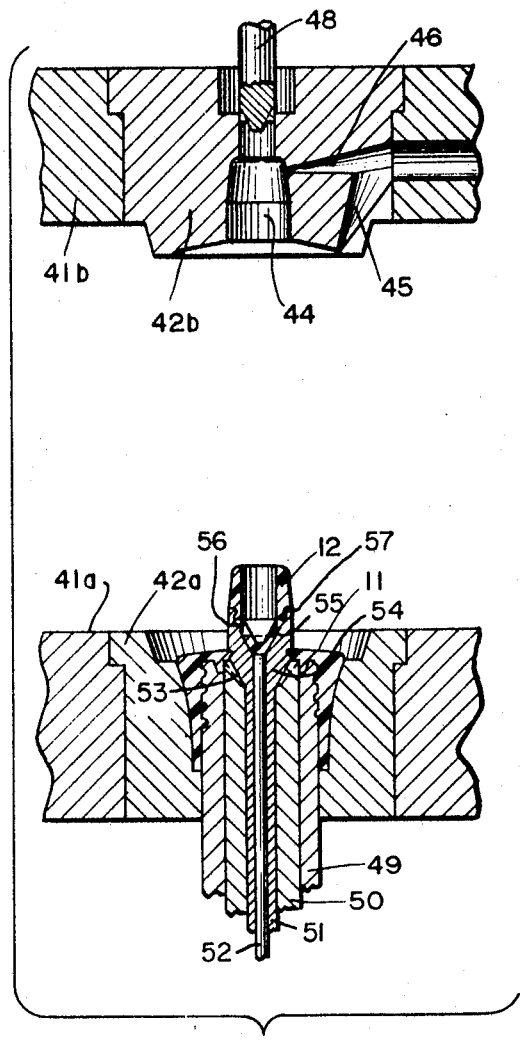

The action of the mold may best be understood by reference to the sequential operation thereof as shown in FIGURES 6 through 10 of the drawings. Initially the molten material is injected into the primary and secondary cavities 43 and 44 to respectively fill with same. The mold 40 remains in closed position as shown in FIGURE 6 of the drawings until the molten material has solidified and set, at least to the extent necessary prior to the opening steps of the mold. The core pin 48 is then moved upwardly apart from the secondary cavity 43 so as to expose the fluid dispensing portion 25 of the movable member 12 whereupon, sequentially, the secondary plate 41b and its insert portion 42b are longitudinally separated from the remaining portions of the mold so as to fully expose both the inner and outer portions of the dispensing portion 25 as well as the upper portions of the top wall 13 of the fixed piece 11 as shown in FIGURE 7. Alternately the core pin 48 could be in fixed position relative to the movable plate 41b so as to upwardly move in a unit therewith and thus arrive at the partially open position of the mold as shown in FIGURE 7 of the drawings.

Figure 8:
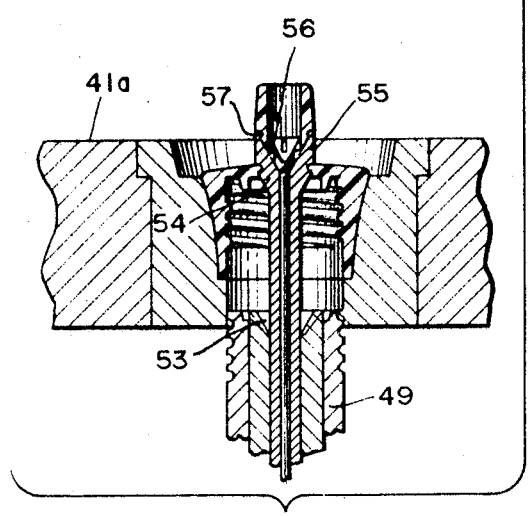

Thereafter the rotatable sleeve 49 is then downwardly rotated so as to permit the freeing of the screw threads shown formed on the inside of the downwardly dependent wall of the fixed member of the closure. After such action the intermediate slidable sleeve 50 is downwardly withdrawn relative to inner sleeve 51 and the pin 52. This intermediate opening position of the mold is depicted in FIGURE 8 of the drawing. Thereafter the inner sleeve 50 is downwardly withdrawn along with the pin 52 to the position as shown in FIGURE 9 of the drawings. It should be noted that in such downward action, the claw-like portions 57 of the shoulder 54 of the sleeve 51 inwardly and downwardly deflect the bead portion of the top wall so as to permit its passage downwardly through the opening 17, whereupon continued downward movement is permitted by the further outward deflection of the individual flange members 19. It should be noted that as this shoulder portion 54 of the sleeve 51 clears the bead 22 portion of the top wall 13, the groove 28 of the holding means 21 is positioned adjacent thereto and that upon the upward return of the temporarily deformed bead 22, such is snugly engaged with such groove and accordingly brings about the assembly of the movable member 12 into position and operative contact with fixed member 11. Further downward motion of the movable member 12 is prevented by a stop motion of the core pin 52 which is designed to reach its lowermost position at that point whereupon the claw-like portions of the slidable sleeve 51 are disassociated with the groove 28 of the movable piece 12.

Further downward movement of this sleeve 51 to a position removed from the terminal portions of the flanges 19 permits such temporarily deformed flanges to spring upwardly into their molded position as defined and shown by FIGURE 6 of the drawings, and accordingly into intimate sealing contact with the side walls 31 of the valve member 26. The pin 52 thereupon may be forwardly moved, the plate 41a rearwardly moved or a combination of both so as to strip the thus assembled closure 10 from the primary cavity 43 and place such in position as shown in FIGURE 10 to be removed from the mold through conventional means such as a stripper comb or poppet valve air assist. The relative movements of the various mold parts above described are brought about in known manners such as through the use of stop and/or lost motion means.

The operation of the alternate embodiment as depicted in FIGURE 11 of the drawings is similar to that as shown in FIGURES 6 through 10, except the relative motion between the slidable sleeve 50 and the inner sleeve 51 has been eliminated by means such as the set screw 60 depicted. Thus, after the rotatable sleeve 49 has been downwardly moved to a position beneath the lower extent of the primary cavity 43, both sleeves 50 and 51 are downwardly moved as a unit and, accordingly, the movable member 12 is brought into assembled position with the fixed part 11 as heretofore brought out. It should also be set out that the molding of other style closure members than that specifically shown may eliminate the need of a rotatable outer sleeve core 49. Thus with closure designs eliminating screw threads, the outer sleeve 49 could be made integral with the intermediate slidable sleeve 50 and accordingly act as a unit therewith.

Accordingly, it is believed that means for the seriatim molding and assembling of a novel two-piece fluid dispensing closure has been set out whereupon the relative opening motions of the mold bring about such assembly and wherein such assembly is accomplished in a minimum amount of mold space and within a conventional molding cycle so as to effect economies in operation over and above those possible with conventional techniques.

I claim:
1. An injection mold for seriatim molding and assembling a product from a plurality of substantially separate components, said mold comprising: means forming a primary cavity, means forming a secondary cavity and means for filling said cavities with molten material which solidifies to a shape-retaining form whereby primary and secondary components will be formed, means for moving said secondary component formed therein relative to said primary component and into assembled contact therewith, said means for moving said secondary component being operable upon opening said mold and including a first core sleeve forming a portion of said primary cavity and a second core sleeve positioned inwardly of said first sleeve and forming a portion of said secondary cavity, said first sleeve having terminal bosses at one end thereof, said second sleeve having a terminal headed portion having downwardly and inwardly disposed supporting shoulders, said bosses contacting said shoulders when said mold is closed, said headed portion further provided with undercut means for retaining said secondary component in contact therewith, and a core pin slidable within said second sleeve and forming a portion of said secondary cavity, said second core sleeve being longitudinally retractable from said secondary cavity a greater distance than said pin so as to strip said secondary component from said undercut means.

2. An injection mold for seriatim molding and assembling a two-piece fluid dispensing container closure having a fixed part in fluid sealing disposition with the contents retaining portion of said container and a movable part adapted to reciprocate between an open dispensing position and a closed sealing position therewith, said fixed part having a top wall portion, said top wall having an opening therethrough and a slotted skirt member extending downwardly from the peripheral area of said opening, said movable part being rotatably mounted within said top wall opening for movement relative to said top wall, said movable part having a valve member having an imperforate base and side walls positioned inwardly thereof, said side walls in slidable sealing contact with said skirt and provided with a fluid dispensing opening therethrough, and said valve member movable from a non-dispensing position wherein portions of said skirt cover said side walls opening to a dispensing position wherein said side walls opening and one of said skirt slots are at least partially aligned, comprising: means forming a primary cavity and means forming a secondary cavity, said primary and secondary cavities being longitudinally separated for respectively molding said fixed and movable parts, means for filling said cavities with a molten material which solidifies to a shape-retaining form, core means extending through said primary cavity and forming a portion of said secondary cavity, said core means being longitudinally movable upon the opening of said mold to position said movable part to a position wherein cooperative attachment means including a groove on said movable part and a bead on said fixed part are laterally adjacent each other and wherein said bead is downwardly deformed by said secondary cavity core means, and means for holding said movable and fixed parts in said laterally adjacent position during additional longitudinal movement of said secondary cavity whereby said bead will upwardly flex to its normal position to engage the groove of said movable member in operatively assembled relationship.

References Cited

UNITED STATES PATENTS 3,013,308  12/1961  Armour _____ 18—2 X

J. HOWARD FLINT, JR., Primary Examiner

U.S. Cl. X.R.

18—42